United States Patent [19]

Okumura

[11] Patent Number: 5,250,884
[45] Date of Patent: Oct. 5, 1993

[54] DRIVE CONTROLLING APPARATUS

[75] Inventor: Yoichiro Okumura, Hachioji, Japan

[73] Assignee: Olympus Optical Co., Ltd., Tokyo, Japan

[21] Appl. No.: 656,815

[22] Filed: Feb. 15, 1991

[30] Foreign Application Priority Data

Feb. 20, 1990 [JP] Japan .................................. 2-40723

[51] Int. Cl.⁵ ............................................. G05B 11/01
[52] U.S. Cl. .................................. 318/560; 318/611; 318/626
[58] Field of Search ............... 187/116, 117, 118, 119, 187/120; 318/611, 560, 626

[56] References Cited

U.S. PATENT DOCUMENTS 4,599,547 7/1986 Ho ........................................ 318/611
4,878,077 10/1989 Maeno et al. ........................ 354/400

Primary Examiner—William M. Shoop, Jr.
Assistant Examiner—Karen Masih
Attorney, Agent, or Firm—Louis Weinstein

[57] ABSTRACT

In a drive controlling apparatus, a driven body is driven by a motor, near to a target position in which the driven body is to be stopped, the speed is controlled on the basis of a deceleration curve characteristic memorized in a first memory means in response to the output of a first speed detector for detecting the moving speed of the above-mentioned driven body and, from near the above-mentioned target position, the speed is switched to be controlled on the basis of a deceleration curve characteristic memorized in a second memory in response to the output of a second speed detector for detecting the moving speed at a precision higher than that of the above-mentioned first speed detecting means.

38 Claims, 9 Drawing Sheets

FIG. 3A
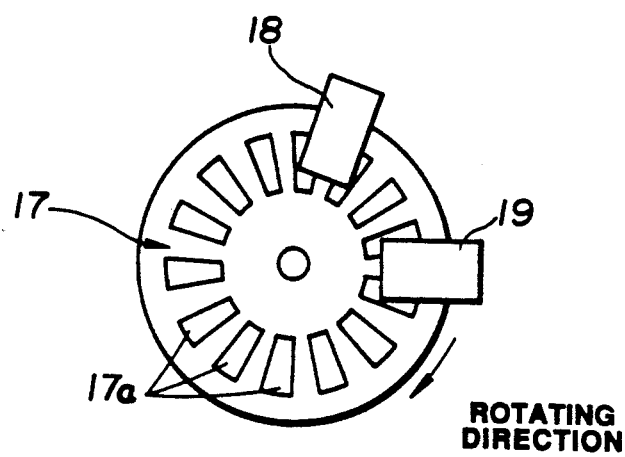
FIG. 3B
FIRST PI OUTPUT SIGNAL 20
SECOND PI OUTPUT SIGNAL 21

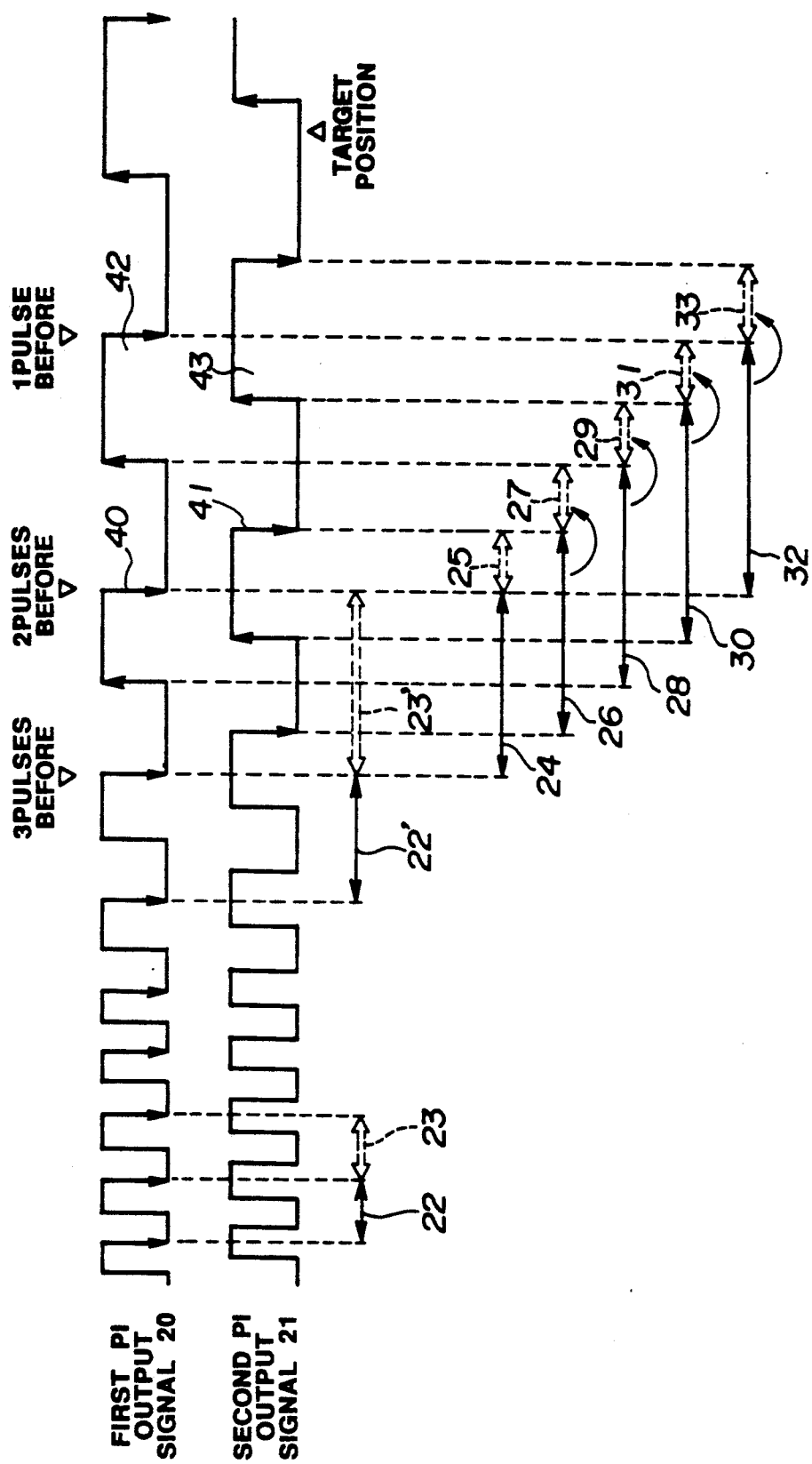

DRIVE CONTROLLING APPARATUS

BACKGROUND OF THE INVENTION

1. Field of the Invention

This invention relates to a drive controlling apparatus and more particularly to a drive controlling apparatus for stopping accurately in a target position a driven body driven by a motor.

2Related Background Art

A drive controlling apparatus for controlling the movement of a driven body driven by a motor has been already extensively used for electronic devices in various fields and is used mostly for an automatic focus adjusting apparatus for controlling a taking lens to move to a focusing target position, for example, in a camera. In this kind of automatic focus adjusting apparatus, by the technical means suggested in Japanese Patent Application Laid Open No. 153526/1988 filed by the present applicant, there is adopted a limited accelerating method whereby a motor drive is controlled by comparing the value of the curve of a deceleration curve characteristic and the value of the moving speed of an actual taking lens with each other and further, at the time point when the taking lens comes near to the focusing position, the on-time of the motor is limited to a fixed time to prevent the excess movement by the inertia when the motor stops.

However, as the above-mentioned limited acceleration is made for a fixed time irrespective of the moving speed and load of the taking lens, the acceleration will be excessive or short. While the motor is switched on, the program will be only counting the time, therefore the signal of the detecting means detecting the above-mentioned moving speed will not be able to be seen and the detection of the moving speed has been likely to be wrong.

Therefore, by the technical means suggested in U.S. Pat. No. 4,878,077 by the present applicant (i.e. assignee), the on-time of the motor is varied in response to the moving speed of the taking lens and the speed can be simultaneously positively detected. That is to say, the lens moving speed by the motor is detected by the speed detecting means, this detected moving speed and the curve of the deceleration characteristic memorized by an optimum memorizing means to stop the taking lens in the target position are compared with each other and the taking lens is moved by the lens controlling means to the focusing position along the curve of the above-mentioned deceleration characteristic. In case the moving speed of the taking lens is higher than the memorized deceleration curve, the motor will be braked but, in case the moving speed is lower, depending on the degree, the motor will be switched on or off so that the speed may be controlled along the deceleration curve. Near the target within the range of the above mentioned deceleration curve, when the motor is on, in order to prevent the acceleration by continuously switching on the motor and to obtain an optimum acceleration in the moving speed at this time point, a motor switching on controlling means will be operated by the signal of the above-mentioned speed detecting means to forcibly switch off (or brake) the motor.

Now, in the technical means suggested in the above-mentioned Japanese Patent Application Laid Open No. 153526/1988 and U.S. Pat No. 4,878,077, a photointerrupter is used as a detecting element for detecting the displacement of the taking lens. That is to say, many slits are provided at regular intervals in the peripheral direction on the peripheral edge of a disc member rotating with the movement of the taking lens and are counted by a photointerrupter (abbreviated as PI hereinafter) made by arranging a light emitting part and light receiving part as opposed to each other with the moving path of these slits between them and the lens displacement is detected by the obtained output signal of the photointerrupter. The moving speed of the taking lens detected by measuring the pulse intervals of the above-mentioned PI output signal.

Now, in order to improve the detecting precision of the PI mechanism detecting the displacement of the above-mentioned taking lens, it is necessary to increase the PI output signal for the unit movement of the taking lens. Therefor it is considered (1) to elevate the driving gear ratio of the rotating slit disc or (2) to reduce the thickness of the slits of the disc and increase the number of the slits. However, by such technical means, the frequency of the PI signal will become high, the excessive responding characteristic of the waveform shaping circuit will not be followed and therefore there will be produced (I) a problem of the slit working technique and (II) a limit to the processing speed of the CPU.

If the width of the slit is left as it is but the diameter of the disc member is made large, the slit working technique among them will be solved but then the contour dimension and hence the disc will become so large that the portability of the camera will be reduced. If the clock frequency of the CPU is elevated, the processing speed of the CPU will be solved. However, if it is considered that, when the motor is driven, the power source voltage will occasionally drop, there will be reasons that, in order that the CPU may positively carry out its process even under a low voltage, it will be necessary to reduce the clock frequency and therefore the operating speed can not be generally elevated.

On the other hand, in such taking lens displacement detecting means as is described above by the PI mechanism, there is another problem that the PI pulse width is too different between the high speed driving time far from the target position and the low speed driving time near the target position. That is to say, if the high speed driving time is considered heavy, the detecting precision at the low speed driving time will become low but, if the low speed driving time is considered heavy, the clock will not be able to be detected at the high speed driving time and a physical limit will be produced.

SUMMARY OF THE INVENTION

An object of the present invention is to provide a drive controlling apparatus wherein the above-described conventional problems are dissolved and, while keeping the diameter and slit width of a disc member of a PI mechanism and the frequency of the PI output signal exactly the same as they have been, the precision of detecting the driven amount of a driven body near a target position is improved.

In the present invention, two sets of PIS for sensing the slits of a disc member are arranged to output a signal having a phase difference, the PI pulses during the full speed drive of a motor are thereby counted, while the CPU operation is well in time in the control range, the movement of a driven body will be controlled by a signal of one set of the PIS and thereafter the control by the pulse width of the two sets of the PIS will be switched on to detect the displacement at a point adjacent to a target position. Therefore, according to the present invention, there are developed remarkable effects that, without increasing the conventional frequency of the PI output signal, diameter of the slit disc and processing speed of the CPU, the driven body displacement detecting precision can be improved, the precision of the control near the target position is improved and the stopping precision is improved.

BRIEF DESCRIPTION OF THE DRAWINGS

FIG. 3A is an arrangement view showing the formation of an encode employed apparatus FIG. 2.

FIG. 3B is a timing chart of PI output signals from the photointerrupter shown in FIG. 3A.

FIG. 4 is a timing chart for the curve control moving a taking lens to a target position.

DETAILED DESCRIPTION OF THE PREFERRED EMBODIMENTS

Figure 1:
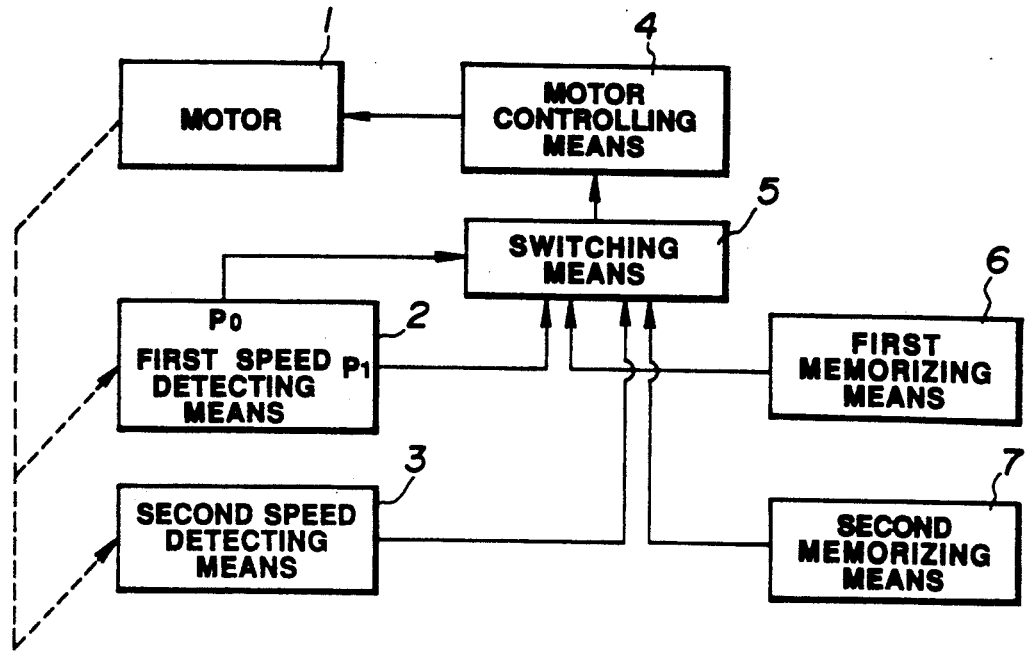
FIG. 1 is a schematic block diagram of a drive controlling apparatus showing a first embodiment of the present invention.

FIG. 1 is a schematic diagram of a drive controlling apparatus showing the first embodiment of the present invention.

By the way, the following respective embodiments shall be explained with an example in which a drive controlling apparatus according to the present invention is applied to the lens drive in an automatic focus adjusting apparatus of a camera.

In this first embodiment, until a lens which is, for example, a driven body reaches 2 to 3 pulses before a target position which is a focusing position, a signal of a moving speed output from an output port Pl of a first speed detecting means 2 and a signal of a deceleration curve output from a first memorizing means 6 in which a deceleration curve corresponding to it is memorized are selected by a switching means 5.

On the other hand, when the lens reaches 2 to 3 pulses before the target position, the switching means 5 will be switched by a signal of a lens displacement output from an output port PO of the above-mentioned first speed detecting means 2 and a signal of a moving speed output from a second speed detecting means 3 detecting the speed at a precision higher than of the above-mentioned first speed detecting means 2 and a signal of a deceleration curve output from a second memorizing means 7 in which a deceleration curve corresponding to the output of this second speed detecting means 3 is memorized will be selected. In either case mentioned above, the output of the switching means 5 will be fed to a motor 1 through a motor controlling means 4 and the speed will be controlled on the basis of the above-mentioned respective deceleration curves.

Figure 2:
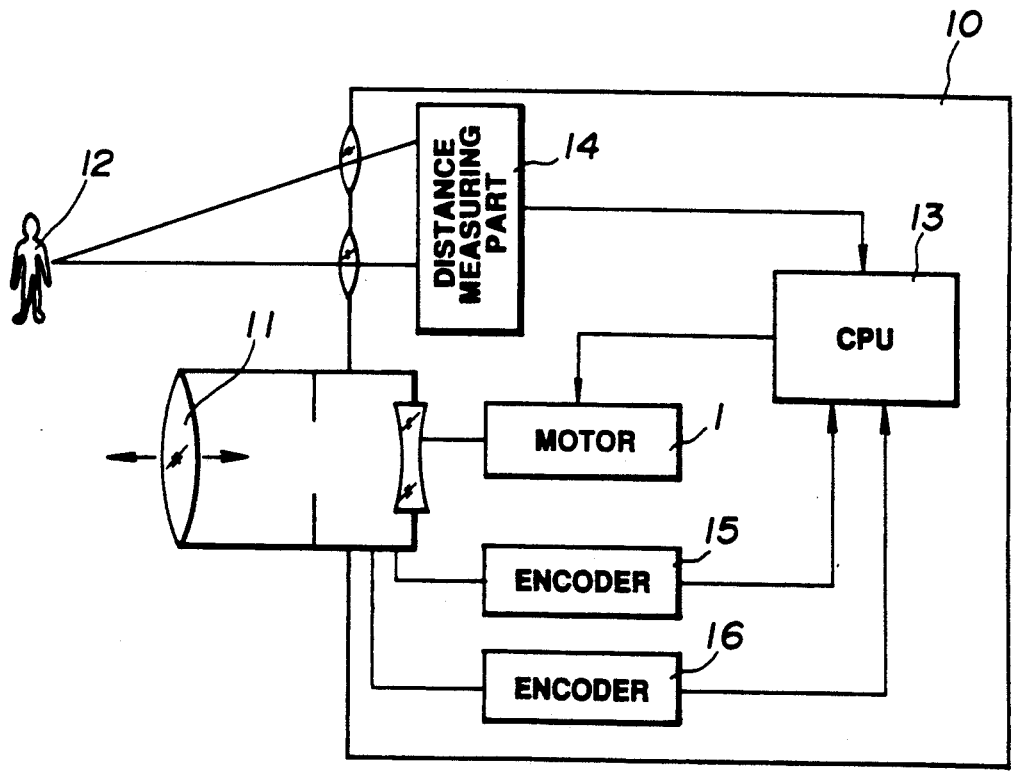
FIG. 2 is a schematic block diagram of an automatic focus adjusting apparatus of a camera.

FIG. 2 shows the scheme of the formation of an automatic focus adjusting apparatus of a camera. In the drawing, when the distance information to an object 12 measured in a distance measuring part 14, for example, by a triangle distance measuring method, is transmitted to a CPU 13 within a camera body 10, the CPU 13 will determine the displacement of a taking lens 11 from the distance information, will switch on the motor 1 and will start the movement of the taking lens 11 at a high speed. The moving speed and displacement of the taking lens 11 will be generated as pulses by encoders 15 and 16 consisting of photointerrupters, will be fed back to the CPU 13 and will be deducted by a counter.

As shown in FIG. 3A, each of the encoders 15 and 16 is formed of slits 17a of a disc member 17 rotating with the drive of the motor 1 and two sets of PIS 18 and 19 arranged with the moving path of these slits 17a held on both sides. In response to the rotation of the above-mentioned slits 17a, as shown in FIG. 3B, PI output signals 20 and 21 different in the phase from each other will be output respectively from the first PI 18 and second PI 19.

FIG. 4 is a timing chart of a motor control (briefly mentioned as a curve control hereinafter) in which a deceleration curve memorized in a memorizing means and a moving speed of an actual taking lens are compared, the taking lens is moved to a focusing position which is a target and an initial movement in which the moving speed of the motor is high to a final movement at a low moving speed near a target stopping position are shown. This curve control itself is described in detail in the above-mentioned Japanese Patent Application Laid Open No. 153526/1988 and U.S. Pat. No. 4,878,077, which documents are incorporated herein by reference thereto and therefore shall not be explained in detail here.

The curve control is made by the pulse intervals of only the PI output signal 20 until 2 pulses before the target position in the control range. That is to say, the pulse interval 22 is measured and, on the basis of the result, the curve control of the section 23 is carried out.

The following measurement is started in advance to make the later-described control by using two sets of PIS 18 and 19 from 3 pulses before the target position. That is to say, there are determined four pulse intervals: the first pulse interval 24 from the fall of the first PI output signal 20 to the next fall, the third pulse interval 28 from the rise of the same signal 20 to the next rise, the second pulse interval 26 from the fall of the second PI output signal 21 to the next fall and the fourth pulse interval 30 from the rise of the same signal 21 to the next rise.

The range from 2 pulses before the target position to ½ pulse before the target position is controlled by the pulse intervals 24, 28, 26 and 30 determined by the above-described method. That is to say, when the falling edge 40 of the first PI output signal 20 is detected, from the moving speed of the taking lens determined from the above-mentioned pulse interval 24, the lens moving speed of the section 25 following this pulse interval 24 will be curve-controlled. In the same manner, when the falling edge 41 of the second PI output signal 21 is detected, the section 27 will be controlled by the pulse interval 26 to thus sequentially make a curve control. This is because, for the slits of a fixed rotation, the ratio of "H" to "L" of the PI output signal is not always 1:1 and therefore, even if the signal interval between the first PI output signal and the second PI output signal is measured, the speed will not be able to be converted. From ¼ pulse before the target position, the motor is braked and the lens is stopped in the target position to end the operation.

The taking lens drive controlling operation in the above-mentioned CPU shall be explained in the following by using the flow chart shown in FIG. 5.

When this program is started as by the operation of a release switch, first of all, the CPU 13 will output an order to the distance measuring part 14 to measure the AF (autofocus) distance. When the distance measuring data are received from the distance measuring part 14, the lens target position will be converted to an encoder pulse number (step S1). The apparatus employed to convert the distance measuring data to an encoder pulse number may also be referred to as driving amount operating means. Here, whether the taking lens 11 is in the target position or not is confirmed (step S2). In case it is in the target position, the taking lens 11 will be considered to be already in the focused position and the AF operation will end. In case it is not in the target position, the drive of the motor 1 will be started (step S3). After the motor is driven, whether the taking lens position is within the control range or not is checked (step S4). In case it is not within the range, the motor 1 will be continued to be electrified to provide a full speed drive. When the taking lens moves into the control range, then whether it is within a predetermined range or not will be checked (step S5). When it is not within the predetermined range, a desired curve control will be made (step S6) while the next pulse interval 23 is being regulated by the pulse interval 22 from the falling edge of the first PI output signal 20 to the next falling edge. When it is within the predetermined range, whether it is ¼ pulse before the target position or not will be checked (step S7). If it is not before, as described above, the interval from 2 pulses before the target position to ¼ pulse before the target position will be curve-controlled (step S8) by the pulse intervals (the pulse intervals 24, 26, 28 and 30 shown in the above-mentioned FIG. 4) of the rising edges of falling edges of both signals of the first PI output signal 20 and second PI output signal 21. The steps S6 and S8 may also be characterized as the drive controlling means which utilizes the output pulses of only the first pulse generating means when the required driving amount is within the control range and above a predetermined value and which utilizes the outputs of both the first and second pulse generating means when the required driving amount is below the predetermined value. Steps S4, S5 and S7 comprise judging means for judging whether the driven member is respectively within the control range, the predetermined range and the "¼ pulse" range. When ¼ pulse before the target position is reached, the motor will be braked (step S9) and the lens will be stopped in the focused position to end the operation.

Figure 5:
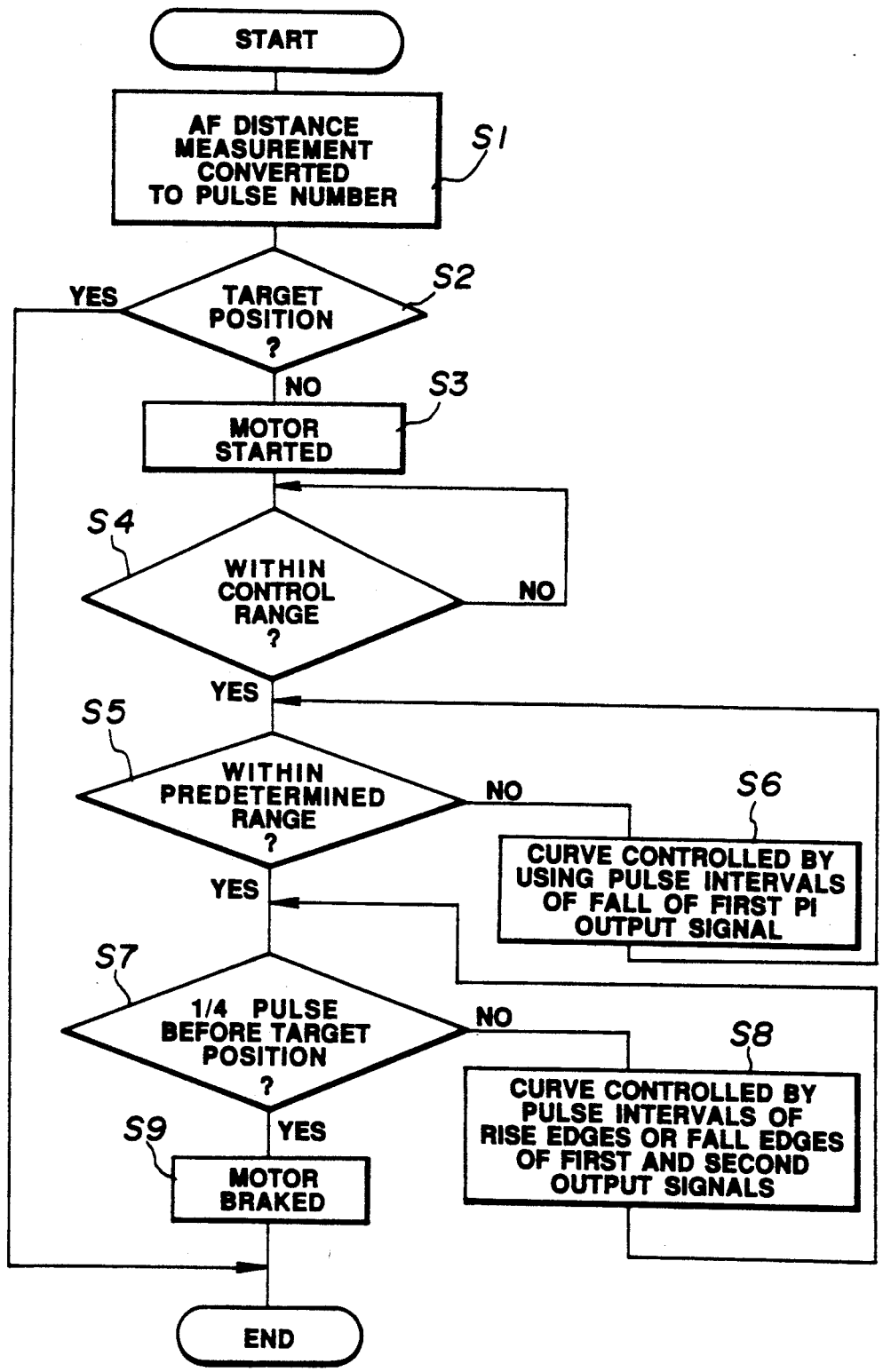
FIG. 5 is a flow chart of the CPU lens drive control in the above-mentioned FIG. 2.
Figure 6:
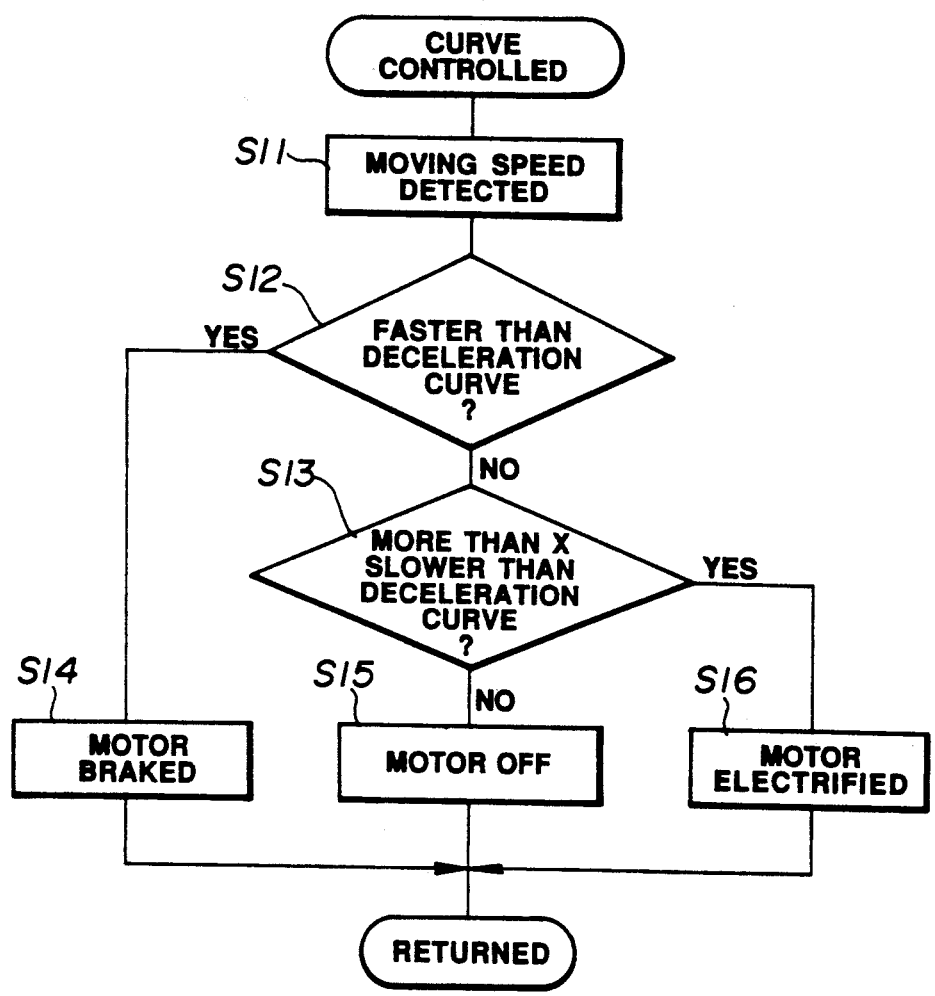
FIG. 6 is a flow chart showing the details of a subroutine of the curve control in the steps S6 and S8 in the flow of chart FIG. 5.

FIG. 6 is a flow chart of a sub-routine of the curve control included in the steps S6 and S8 in the above-mentioned FIG. 5. First of all, the moving speed of the present taking lens 11 is detected (step S11) and this lens moving speed and the value on the deceleration curve corresponding to the present displacement are compared with each other (step S12). Here, the moving speed of the taking lens 11 is detected by measuring the pulse intervals of the photointerrupter. In case the moving speed is faster than the deceleration curve, the moving speed will be braked and decelerated (step S14). In case it is slower, a value x will be subtracted from the value of the deceleration curve and whether it is faster or slower than this will be judged (step S13).

In case the moving speed is judged to be faster, the motor will be switched off (open) (step S15) and the taking lens 11 will be moved by its inertia force. In case it is judged to be slower, the motor will be electrified (step S16) and the moving speed will be accelerated. Thereafter, the process returns to the main flow shown in the above-mentioned FIG. 5.

Figure 7:
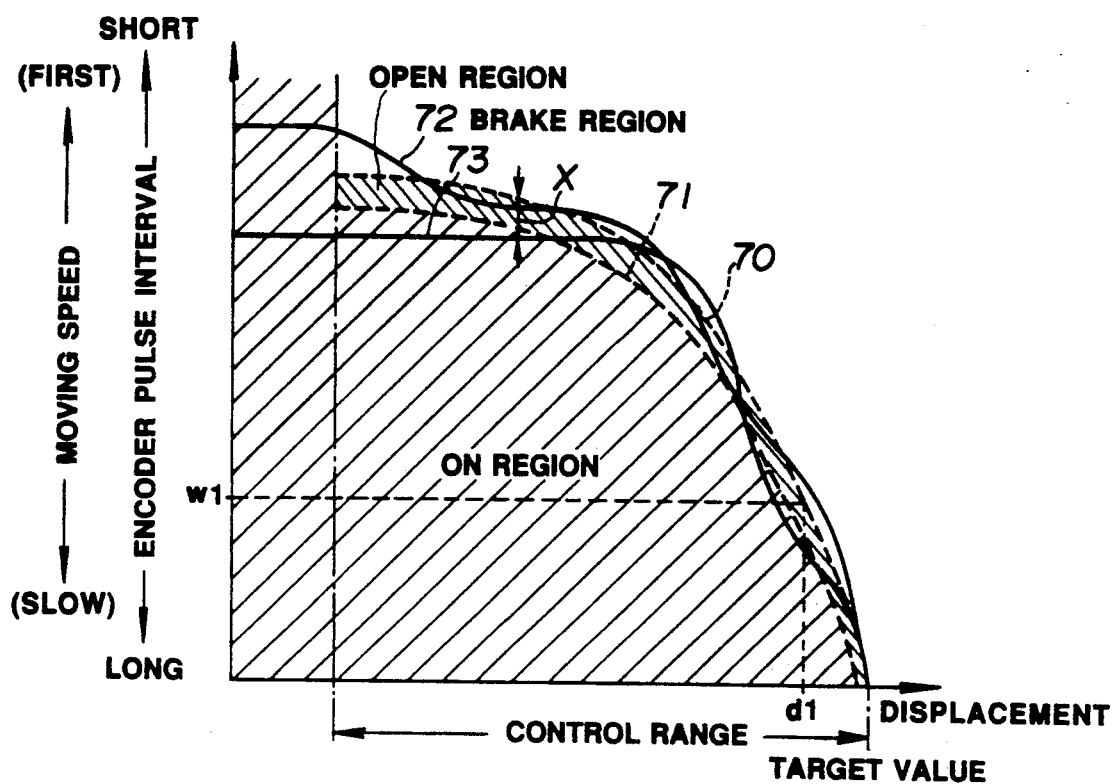
FIG. 7 is a characteristic diagram representing the process of curve-controlling the taking lens with the displacement and moving speed.

FIG. 7 is a diagram showing the deceleration process of the taking lens 11 by the displacement and moving speed. In this FIG. 7, the abscissa represents the displacement of the taking lens 11 and the ordinate represents the moving speed. The deceleration curve is represented by the broken line 70 and the curve made by subtracting a value x from the deceleration curve is represented by the broken line 71. In the diagram, the part hatched diagonally right-upward is an on-region in which the motor 1 is switched on. The part hatched diagonally right-downward and adjacent to this on-region with the broken line 71 as a boundary is an open region switching the motor 1 off (open). A white background braking region is adjacent to this open region with the above-mentioned deceleration curve 70 as a boundary.

Figure 8:
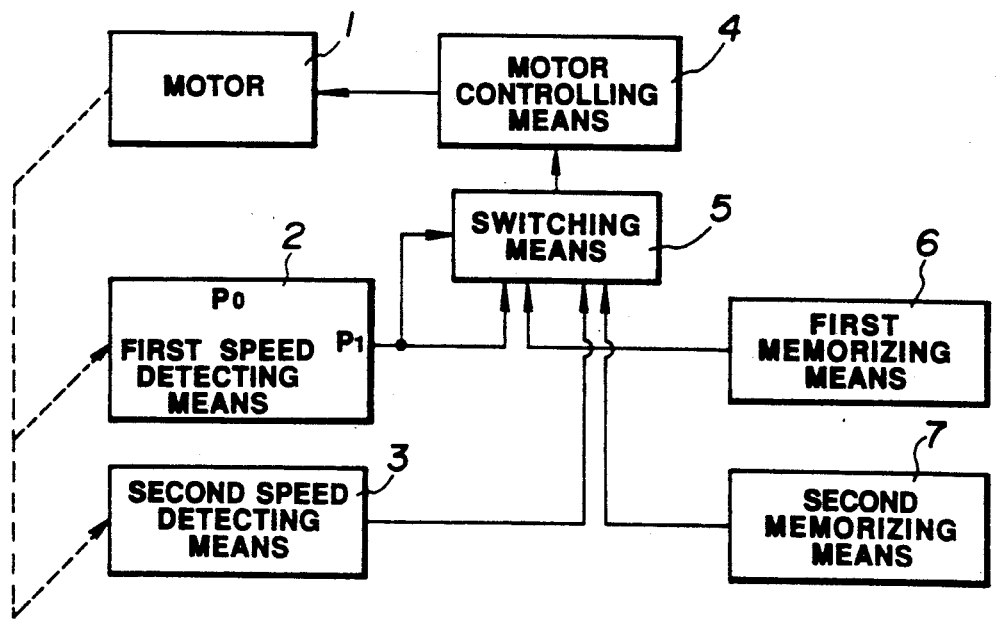
FIG. 8 is a schematic block diagram of a drive controlling apparatus showing a second embodiment of the present invention.

FIG. 8 is a schematic view of a drive controlling apparatus showing the second embodiment of the present invention. In the above-mentioned first embodiment, the switching point switching the curve control by the first speed detecting means 2 and first memorizing means 6 to a curve control by the second speed detecting means 3 and second memorizing means 7 is 2 pulses before the target position, that is, a point d1 on the abscissa plotting the displacement in the above-mentioned FIG. 7 but, in this second embodiment, the above-mentioned switching point is different to be above a predetermined time in the pulse interval, that is, a point w1 on the ordinate on which the moving speed is plotted in the above-mentioned FIG. 7. It shall be explained by using FIG. 4. The curve control is continued by the pulse interval of the first PI output signal in the control range and, when it is detected that the pulse interval from the falling edge of the first PI output signal 20 to the next falling edge has become sufficiently longer than the CPU control operating time as in 22', the pulse interval measuring method will be switched. By the way, in this second embodiment, the same component member as employed in the above-mentioned first embodiment shall bear the same reference numerals and shall not be explained here.

In FIG. 8, for the switching signal applied to the switching means 5, in the above-mentioned first embodiment, the signal of the lens displacement output from the output port PO of the first speed detecting means 2 is used (FIG. 1) but, in this second embodiment, the signal of the moving speed output from the output port PI, that is, the pulse interval of the PI output signal is used. Usually, the nearer the driven body to the target position, the lower the moving speed and therefore the larger the pulse interval of the PI output signal. Therefore, when this pulse interval exceeds a predetermined value, the curve control will be made by the second speed detecting means 3 high in the driving amount detecting precision and second memorizing means 7.

Figure 9:
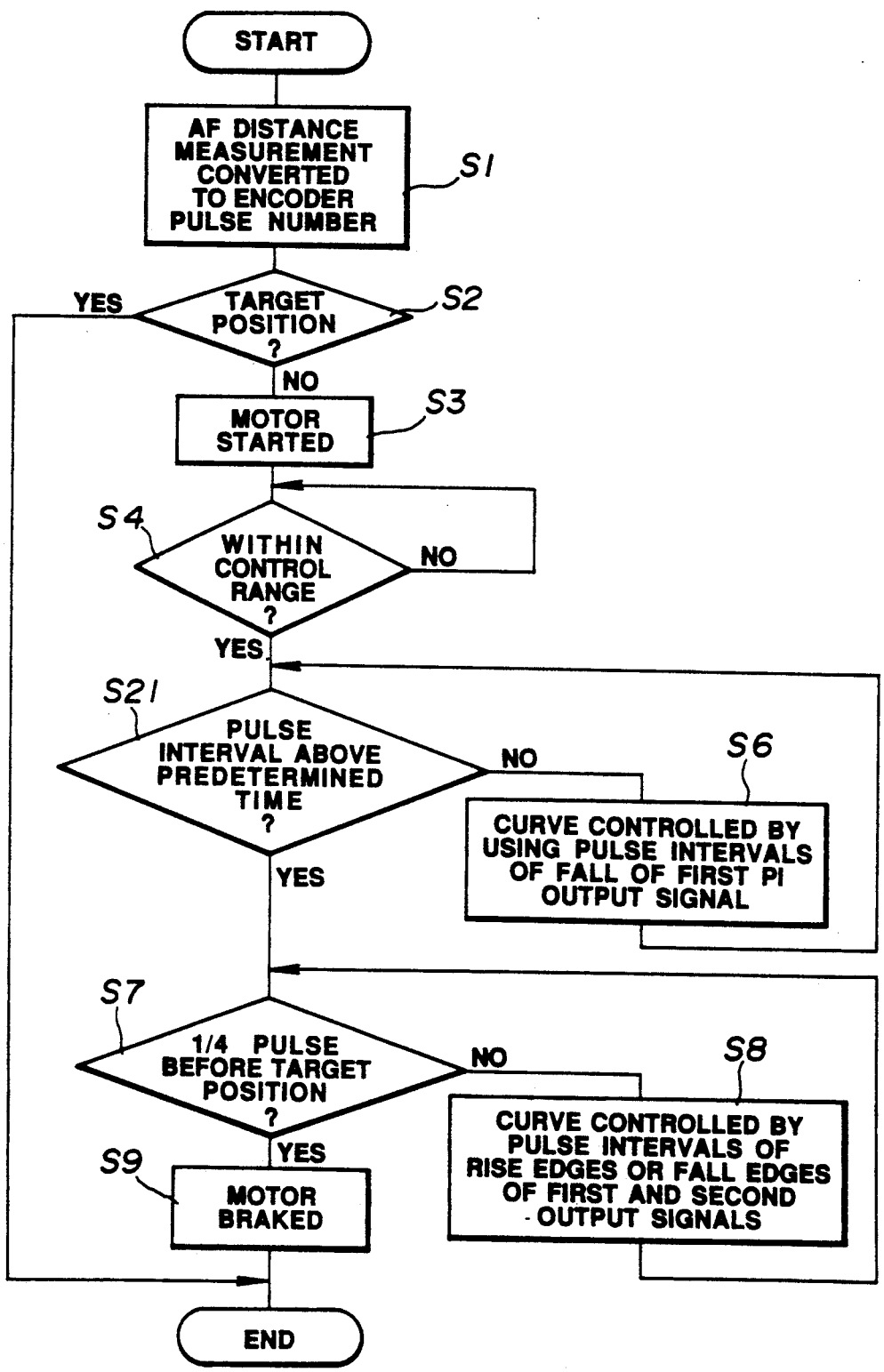
FIG. 9 is a flow chart of the CPU lens drive control in the for the apparatus of FIG. 2.

The lens driving operation of this second embodiment shall be explained in the following by the flow chart in FIG. 9. In FIG. 9, the step S5 in FIG. 5 showing the flow in the above-mentioned first embodiment is replaced by the step S21 in FIG. 9 but the steps S1 to S4 and S6 to S9 are exactly the same in FIGS. 5 and 9 therefore and the same steps shall bear the same step numbers and shall not be explained here in connection with FIG. 9. In the step S21 in FIG. 9, it is judged whether the pulse interval of the PI output signal is above the predetermined time or not so that the switching point of the switching means 5 (See FIG. 8) may be judged.

Figure 10:
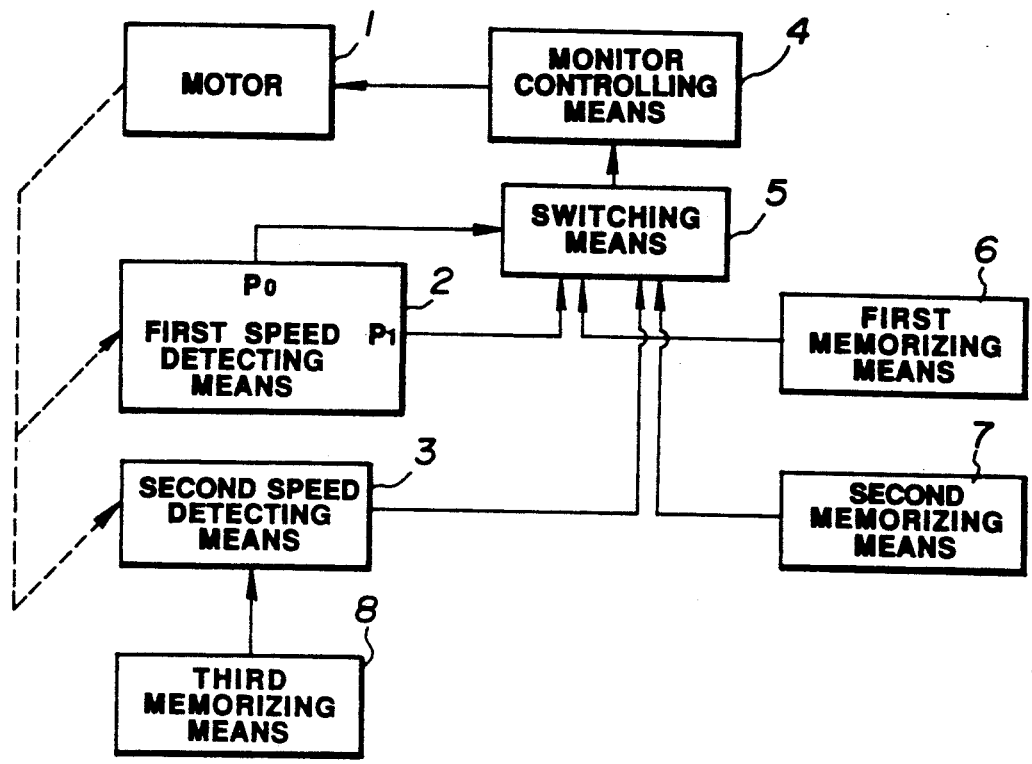
FIG. 10 is a schematic block diagram of a drive controlling apparatus showing the third embodiment of a present invention.
Figure 11:
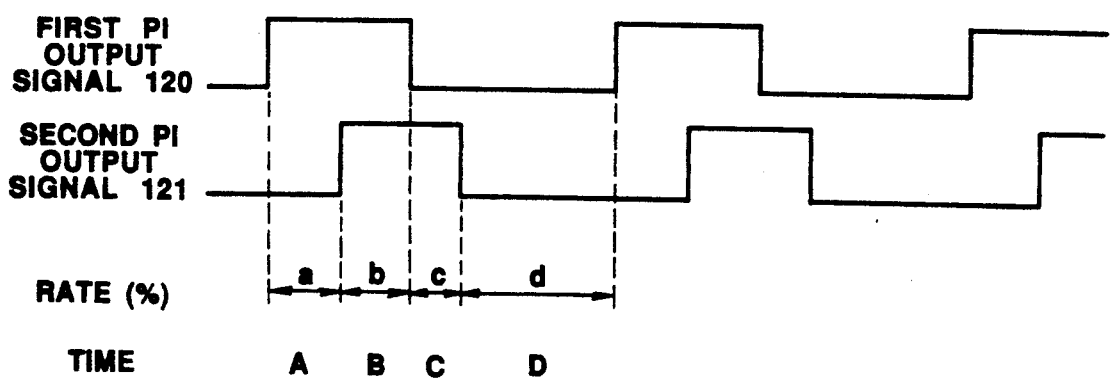
FIG. 11 is a timing chart of PI output signals.

FIG. 10 is a block diagram of a drive controlling apparatus showing the third embodiment of the present invention. In the above-mentioned first and second embodiments, due to the lag of "H" and "L" of the first PI output signal 20 and second PI output signal 21, even if the time between both signals is measured, the speed will not be able to be converted but, in this third embodiment, as shown in FIG. 10, for the second speed detecting means 3, some operation is applied to the time between both signals by the information of the third memorizing means 8 so that the speed conversion may be possible. It shall be explained in the following by FIG. 11. By the way, also in this third embodiment, the same component members as of the above-mentioned first embodiment shall bear the same reference numerals and shall not be explained here.

As is similar to the waveforms shown in the above-mentioned FIG. 3B, the first PI output signal 120 and second PI output signal 121 (FIG. 11) detect the slits 17a of the same disc member 17. Therefore, if the disc member rotates at a fixed speed, the detected output signal frequencies will be the same. However, due to the differences of the characteristics of the respective PI units and waveform shaping circuits, the time ratio of the respective "H" and "L" portions of each pulse cycle will not always be the same.

That is to say, if the section in which the first PI output signal 120 is at the "H" level is made a: b with the rising edge of the second PI output signal, being the dividing point, that is, A seconds and B seconds as represented by time, the section in which the first PI output signal 120 is at the "L" level will be divided into c: d with the falling edge of the second PI output signal 121 being the dividing point, that is, into C seconds and D seconds as represented by time. In this case, even if the arranging positions of the first PI unit 18 and second PI unit 19 shown in the above-mentioned FIG. 3A are mechanically adjusted to be $a:b=1:1$, usually the duty ratio of the pulse outputs of the first PI output signal 120 and second PI output signal 121 will not be 1:1 and therefore $c:d \neq 1:1$.

Therefore, they will not always be:

$a:c=1:1$ $a:d=1:1$.

Therefore, in this third embodiment, by noting that, if the speed of the disc member does not vary, the ratio of a: c: d will not vary, this information is memorized in such third memorizing means 8 (See FIG. 10) as, for example, An E²PROM when the product is completed. By dividing the actually measured time by the information of this ratio, the speed making the section of a=1 is calculated.

Figure 12:
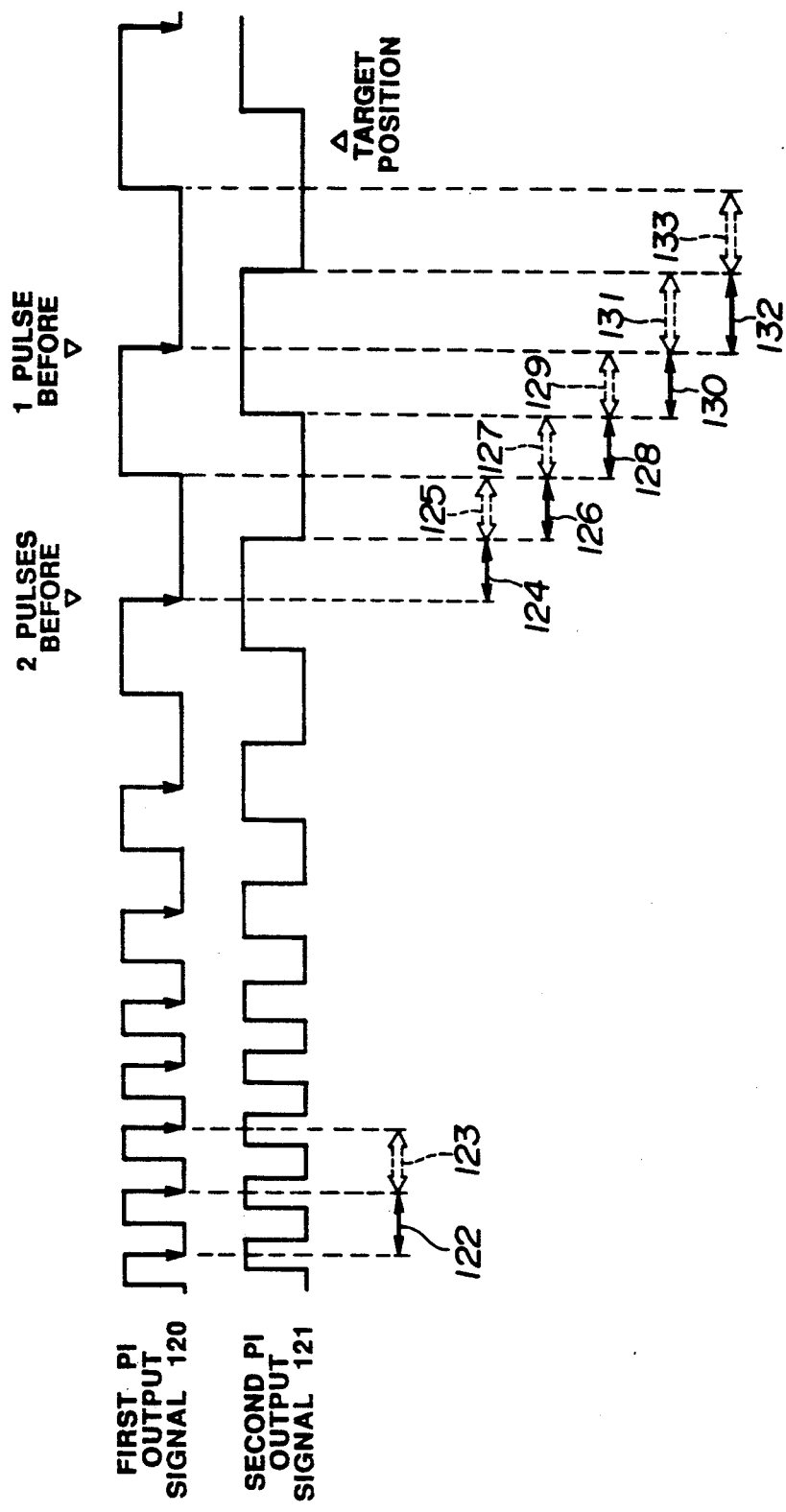
FIG. 12 is a timing chart of the curve control employed in the apparatus of FIG. 10.

FIG. 12 is a timing chart for explaining a controlling method using the curve control in this third embodiment and explains the place where the motor driving speed is high and the place which is near the target stopping position and in which the motor driving speed is low. Until 2 pulses before the target position in the predetermined range, the curve control is made by the pulse interval 122 of the first PI output signal 120. From 2 pulses before the target position to ¼ pulse before the target position, the speed is calculated from the pulse interval of the section 124 from the falling edge of the first PI output signal 120 to the falling edge of the second PI output signal 121 by the method explained in the above-mentioned FIG. 11 and the speed is controlled in the section 125 from the falling edge of the second PI output signal 121 to the rising edge of the next pulse of the first PI output signal 120. In the same manner, the speed is calculated from the pulse interval of the section 126 from the falling edge of the second PI output signal 121 to the rising edge of the first PI output signal 120 and the speed is controlled in the section 127 from the rising edge of the first PI output signal 120 to the rising edge of the next pulse of the second PI output signal 121 to thus sequentially make the curve control. From ¼ pulse before the target position, the motor is braked and the driven body is stopped to end the operation.

In the above-described respective embodiments, an example in which the drive controlling apparatus according to the present invention is applied to an automatic focus adjusting apparatus of a camera has been explained but it is needless to say that the present invention can be extensively applied to a driving apparatus for driving a driven body (other than a lens) by a motor.

What is claimed is:

1. A drive controlling apparatus for driving a driven body by a motor, comprising:

a first encoder generating pulses in response to the movement of said driven body;

a second encoder generating pulses in response to the movement of said driven body with a phase different from that of said first encoder;

a judging means subtracting pulses outputted from one of said first encoder and second encoder from a driving count representing a displacement between a present position and a target position of the driven body being controlled by said drive controlling apparatus and judging whether the result is within a predetermined range of the target position;

a motor speed controlling means whereby, in a control range at least near said target position, when a result of said judgement is outside a predetermined range, the speed of said motor will be controlled employing a pulse interval of pulses output from a selected one of said first encoder and second encoder; and said motor speed controlling means including means, whereby, when a result of said judgement is inside the predetermined range, the speed of said motor will be controlled with a pulse interval of pulses output from both said first encoder and second encoder.

2. A drive controlling apparatus according to claim 1 characterized in that:

said motor speed controlling means responsive to the driven object reaching a predetermined location near said target position controls the speed on the basis of: a a first pulse interval between falling edges of successive pulses output from said first encoder, a second pulse interval between falling edges of successive pulses output from said second encoder, a third pulse interval between rising edges of successive pulses output from said first encoder and a fourth pulse interval between rising edges of successive pulses output from said second encoder.

3. A drive controlling apparatus according to claim 1 characterized in that:

said motor speed controlling means has a first memorizing means for memorizing information representing a first deceleration curve corresponding to said pulse intervals to stop said driven body at a target position, and first comparison means to compare said first deceleration curve and said pulse intervals and selectively switches said motor on/off and controls a brake for braking the motor on the basis of a result of a comparison.

4. A drive controlling apparatus according to claim 1 characterized in that:

said motor speed controlling means further comprises second memorizing means for memorizing information representing a second deceleration curve corresponding to said pulse intervals to stop said driven body at a target position, and second comparison means to compare said second deceleration curve and said pulse intervals and selectively switch said motor on/off and controls a brake for braking the motor on the basis of the result of a comparison of said second comparison means.

5. A drive controlling apparatus according to claim 1 being further characterized by comprising:

a means for detecting whether the driven body is within said controllable range and making providing a full speed drive in case the driven body is outside said controllable range.

6. A driving apparatus for driving a driven body from a present position toward a predetermined target position by a motor and controlling the motor drive near said target position, comprising:

a first pulse generating means for generating a first pulse in response to a movement of said driven body;

a second pulse generating means for generating a second pulse differing in phase from said first pulse in response to the movement of said driven body;

a driving amount operating means for providing the required driving amount from the present position of said driven body to said target position; and a drive controlling means for controlling the drive of the motor employing only the output of said first pulse generating means when a required driving amount is above a predetermined value in a control range near said target position and controlling the drive of the motor employing the outputs of said first pulse generating means and said second pulse generating means when a required driving amount is below the predetermined value.

7. A driving apparatus according to claim 6 characterized in that the pulse generated from said first pulse generating means and the pulse generated from said second pulse generating means are of substantially the same frequency.

8. A driving apparatus comprising:

a motor for driving a driven body from a present position to a predetermined target position;

a pulse generating means for generating pulses in response to a movement of said driven body;

a speed detecting means responsive to said pulse generating means for detecting a moving speed of said driven body;

a driving amount operating means for providing a required driving amount from the present position of said driven body to said target position;

a memorizing means for memorizing information representing a deceleration curve to stopping said driven body when in the target position; and a drive controlling means for controlling the drive of said motor responsive to the outputs of said speed detecting means and driving amount operating means and a memorized value stored in said memorizing means;

characterized in that:

said pulse generating means comprises:

a first pulse generating means for generating a first pulse corresponding to the movement of said driven body; and a second pulse generating means for generating a second pulse differing in phase from said first pulse and corresponding to the movement of said driven body; and said speed detecting means outputting moving speed information in response to said first pulse when an output of said driving amount operating means is above a predetermined value and outputting moving speed information in response to both said first pulse and second pulse when an output of said driving amount operating means is below the predetermined value.

9. A driving apparatus according to claim 8 further characterized in that the pulse generated from said first pulse generating means and the pulse generated from said second pulse generating means are of substantially the same frequency.

10. A driving apparatus according to claim 8 wherein said speed detecting means further has a second memorizing means for memorizing the phase difference between said first pulse and second pulse.

11. A driving apparatus for driving a driven body from a present position toward a predetermined target position by a motor and controlling the drive of the motor near said target position, comprising:

a first speed detecting means for detecting a moving speed of said driven body with a first precision;

a second speed detecting means for detecting a moving speed of said driven body with a second precision higher than said first precision;

a driving amount operating means for providing a required driving amount from the present position of said driven body to said target position; and a drive controlling means for controlling the drive of the motor employing the output of said first speed detecting means when said required driving amount is above a predetermined value near said target position and controlling the drive of the motor employing the output of said second speed detecting means when said required driving amount is below the predetermined value.

12. A driving apparatus according to claim 11 wherein:

said first speed detecting means outputs the speed information responsive to an output of a first pulse generating means for generating a first pulse in response to the movement of said driven body; and said second speed detecting means outputs the speed information responsive to an output of a second pulse generating means for generating a second pulse which differs in phase from said first pulse in response to the movement of said driven body and responsive to the output of said first pulse generating means.

13. A driving apparatus for driving a driven body from a present position to a target position by a motor, comprising:

a first encoder for generating pulses in response to the movement of said driven body;

a second encoder for generating pulses in response to the movement of said driven body with a phase different from that of said first encoder;

judging means for determining a speed of said motor from a pulse interval of pulses outputted from one of said first encoder and second encoder and judging whether this speed is higher or lower than a predetermined value;

a motor speed controlling means whereby, in a control range at least near said target position, when a result of a judging of said judging means is a determined speed is higher than the predetermined value, the motor will be controlled employing a pulse interval of pulses outputted from one of said first encoder and second encoder; and said motor speed controlling means including means whereby, in a control range at least near said target position, when a result of a judging of said judging means is a determined speed is lower than the predetermined value, the motor will be controlled employing a pulse interval of pulses outputted from said first encoder and second encoder.

14. A driving apparatus according to claim 13 characterized in that:

said motor speed controlling apparatus, in response to the driven member reaching a predetermined position near said target position controls the operating speed employing: an interval between a falling edge of a predetermined pulse and a falling edge of a pulse following the predetermined pulse output from said first encoder, an interval between a falling edge of a predetermined pulse and a falling edge of a pulse following the predetermined pulse of said second encoder, an interval between a rising edge of the predetermined pulse of said first encoder and a rising edge of the pulse following said predetermined pulse from said first encoder and an interval between a rising edge of a predetermined pulse and a rising edge of a pulse following said predetermined pulse output from said second encoder.

15. A driving apparatus according to claim 13 characterized in that:

said motor speed controlling means has a first memorizing means for memorizing information representing a first deceleration curve corresponding to a pulse interval to stop said driven body at the target position, and includes first means to compare said first deceleration curve information and said pulse interval and means to selectively switch said motor on/off and controls a braking of the motor employing the result of the comparison; and said motor speed controlling means has a second memorizing means for memorizing information representing a second deceleration curve corresponding to a pulse interval to stop said driven body at the target position, and includes second means to compare said second deceleration curve information and said pulse interval and means to selectively switch said motor on/off and control a braking of the motor responsive to a result of the last-mentioned comparison.

16. A driving apparatus according to claim 13 characterized in that:

said motor speed controlling means has a third memorizing means for memorizing a ratio of pulses output from said first and second encoders, and corrects an interval from a group of intervals including: an interval between a rising edge of a pulse output from one of said first and second encoders and a falling edge of a pulse output from the other one of said second and first encoders and an interval between a falling edge of a pulse output from one of the first and second encoders and a rising edge of a pulse output from the other one of the second and first encoders by using said ratio and controlling the speed responsive to the corrected pulse interval.

17. A driving apparatus according for driving a driven body from a present position toward a predetermined target position by a motor and controlling the drive near said target position, comprising:

a first speed detecting means for detecting the moving speed of said driven body with a first precision;

a second speed detecting means for detecting the moving speed on said driven body with a second precision higher than said first precision;

a driving amount operating means for determining a required driving amount from the present position of said driven body to said target position;

a first memorizing means for memorizing information representing speed controlling curves corresponding to an output of said first speed detecting means and an output of said driving amount operating means to drive said driven body;

a second memorizing means for memorizing information representing deceleration curves corresponding to an output of said second speed detecting means and an output of said driving amount operating means to stop said driven body at the target position;

a drive controlling means whereby, in a control range near said target position, when an output of said first speed detecting means is above a predetermined value, the motor will be controlled employing an output of said first speed detecting means and a memorized value stored in said first memorizing means and, when a output of said first speed detecting means is below said predetermined value, the motor will be controlled employing an output of said second speed detecting means and a memorized value stored in said second memorizing means.

18. A driving apparatus according to claim 17 wherein:

said first speed detecting means outputs speed information employing an output of the first pulse generating means for generating a first pulse in response to the movement of said driven body; and said second speed detecting means outputs speed information employing an output of the second pulse generating means for generating a second pulse differing in phase from said first pulse in response to movement of said driven body and an output of said first pulse generating means.

19. A driving apparatus comprising:

a motor driving a driven body from a present position to a predetermined target position;

pulse generating means for generating pulses in response to movement of said driven body;

speed detecting means for receiving an output from said pulse generating means and detecting a moving speed of said driven body;

a driving amount operating means for providing the required driving amount from the present position of said driven body to said target position;

memorizing means for memorizing information representing a deceleration curve for stopping said driven body at the target position; and a drive controlling means for controlling the motor employing outputs of said speed detecting means and driving amount operating means and a memorized value of said memorizing means;

characterized in that:

said pulse generating means including means for generating a first pulse responsive to movement of said driven body; and second pulse generating means for generating a second pulse differing in phase from said first pulse and responsive to movement of said driven body; and said speed detecting means detecting a moving speed of the driven body in response to said first pulse when a moving speed is above a predetermined value and detecting a moving speed in response to said first pulse and said second pulse and outputting it as a moving speed information when the moving speed is below a predetermined value.

20. A driving apparatus according to claim 19 characterized in that the pulse generated from said first pulse generating means and the pulse generated from said second pulse generating means are of substantially the same frequency.

21. A driving apparatus according to claim 19 wherein said speed detecting means further has a second memorizing means for memorizing the phase difference between said first pulse and second pulse.

22. A driving apparatus for driving a driven body from a present position toward a predetermined target position by a motor and controlling the drive near said target position, comprising:

a first speed detecting means for detecting a moving speed of said driven body with a first precision;

a second speed detecting means for detecting a moving speed of said driven body with a second precision higher than said first precision;

a drive controlling means for controlling the motor employing an output of said first speed detecting means when a moving speed detected by said first speed detecting means is above a predetermined value near said target position and controlling the motor employing san output of said second speed detecting means when the moving speed is below said predetermined value.

23. A driving apparatus according to claim 22 wherein:

said first speed detecting outputs speed information employing an output of the first pulse generating means for generating a first pulse in response to movement of said driven body; and said second speed detecting means outputs speed information employing an output of the second pulse generating means for generating a second pulse which differs in phase from said first pulse in response to movement of said driven body and the output of said first pulse generating means.

24. A driving apparatus according to claim 1 or 6 or 8 or 12 or 18 or 19 or 23 wherein the pulses from the second speed detecting means are lagging in phase from the pulses of the first speed detecting means.

25. A driving apparatus according to claim 15 or 19 wherein each of said deceleration curves memorized in each of said memorizing means comprises a table of speed and distance values, each distance value related to one of said speed values according to a predetermined deceleration drive.

26. A drive controlling apparatus for driving a driven member by means of a motor, comprising:

a plurality of encoders for generating pulses representing movement of said driven member, the pulses of said encoders being different in phase from one another;

means for determining a distance between a present position of the driven member and a target position;

means responsive to pulses from one of said encoders and said distance value for determining when the driven member has moved to a position within a predetermined distance from said target position;

motor controlling means for controlling said motor utilizing the pulses derived from one of said encoders when said driven member lies outside of said predetermined distance; and said motor controlling means including means for controlling said motor in accordance with the pulses outputted from more than one of said encoders when said driven member lies within said predetermined distance.

27. A drive controlling apparatus according to claim 26 further comprising:

a movable member moved by said motor responsive to driving of said driven member;

said movable member having a predetermined code pattern;

said first and second encoders sensing said code pattern for generating said pulse signals.

28. A drive controlling apparatus according to claim 27 wherein said first and second encoders are arranged relative to said movable member to generate pulses which are different in phase from one another.

29. A drive controlling apparatus according to claim 27 wherein said movable member comprises a disc and said code pattern comprises slots arranged in an annular pattern about said disc;

said encoders sensing said slotted pattern.

30. A driving apparatus according to claim 10 further comprising:

means responsive to the phase difference stored in said second memorizing means for utilizing the data stored in said second memory means to calculate the driving speed.

31. A driving apparatus according to claim 21 further comprising:
 means responsive to the phase difference stored in said second memorizing means for utilizing the data stored in said second memory means to calculate the driving speed.

32. A method for controlling the positioning of a driven body driven by a motor to a desired target position, comprising the steps of:
 (a) determining the distance between a present position of the driven member and the target position;
 (b) developing a plurality of pulse trains responsive to the movement of said driven member wherein the pulses of each pulse train differ in phase from one another;
 (c) developing a value which is a function of the distance determined in step (a);
 (d) reducing said value for each pulse generated by one of said pulse trains;
 (e) reducing the driving speed of said motor when said value reaches a predetermined value;
 (f) controlling the speed of the motor during the occurrence of each pulse of one of said pulse trains when said value is outside of said predetermined value; and
 (g) utilizing the pulses of more than one of said pulse trains to control the speed of the motor when said value lies within said predetermined value to enhance the sensitivity of the control operation.

33. The method of claim 32 wherein said value is a predetermined count and each pulse reduces said count.

34. The method according to claim 32 further comprising the steps of:
 (h) providing a movable member which moves responsive to the driving of said driven member under control of said motor, said movable member having a code pattern;
 (i) said pulse trains developed in step (b) being generated by sensing predetermined locations of said code pattern for generating pulse trains whose pulses differ in phase from one another.

35. The method of claim 32 further comprising the steps of:
 (h) providing in a memory a table representing a deceleration curve for said driven member in which displacement distances from said target position are each associated with a predetermined speed;
 (i) the first control operation further comprising the steps of:
 (j) determining the speed of the driven member from said one pulse train;
 (k) comparing the measured speed with a speed associated with a present displacement distance derived from said table; and
 (l) performing one of three steps which include:
  (i) maintaining the motor energized when the measured speed is less than the speed derived from the table minus a predetermined value; and
  (ii) turning the motor off when the measured speed is greater than the speed derived from the table minus said predetermined value; and
  (iii) braking said motor when the measured speed is greater than the speed derived from the table.

36. The method of claim 35 wherein steps (h) through (l) are utilized during the occurrence of the pulses of at least two of said pulse trains when said count is reduced to a predetermined value.

37. A method for controlling the positioning of a driven body driven by a motor to a desired target position, comprising the steps of:
 (a) determining the distance between a present position of the driven member and the target position;
 (b) developing a plurality of pulse trains responsive to the movement of said driven member wherein the pulses of each pulse train differ in phase from one another;
 (c) developing a value which is a function of the distance determined in step (a);
 (d) reducing said value for each pulse generated by one of said pulse trains;
 (e) reducing the driving speed of said motor when said count is less than a predetermined value;
 (f) determining the driving speed according to the pulses of said one pulse train;
 (g) controlling the speed of the motor during the occurrence of each pulse of one of said pulse trains when the driving speed determined from said one pulse train is equal to or above a predetermined speed value; and
 (h) utilizing the pulses of more than one of said pulse trains to control the speed of the motor when the driving speed determined from said one pulse train lies within said predetermined speed value to enhance the sensitivity of the control operation.

38. The method of claim 37 further comprising the steps of:
 determining the phase difference of pulses in said pulse trains for a given speed; and
 utilizing the phase differences to determine the driving speed of the driven member.

* * * * *

UNITED STATES PATENT AND TRADEMARK OFFICE
CERTIFICATE OF CORRECTION

PATENT NO. : 5,250,884
DATED : October 5, 1993
INVENTOR(S) : Okumura

It is certified that error appears in the above-indentified patent and that said Letters Patent is hereby corrected as shown below:

```
Column  3, line 17, change "encode" to --encoder--
Column  3, line 17, after "employed" insert --in the--
Column  3, line 26, change "of chart" to --chart of--
Column  3, line 34, delete "in the"
Column  3, line 36, change "the third" to --a third--
Column  3, line 36, change "of a" to --of the--
Column  5, line 48, change "edges of" to --edges or--
Column  9, line 44, delete "making"
Column 12, line 32, delete "according"
Column 12, line 39, change "on" to --of--
Column 12, line 61, change "a" to --an--
Column 13, line 68, change "san" to --an--
Column 16, line 28, change "value" to --count--
Column 16, line 30, change "value" to --count--
```

Signed and Sealed this

Sixth Day of September, 1994

BRUCE LEHMAN

Attest:

*Attesting Officer*    *Commissioner of Patents and Trademarks*